(12) United States Patent
Fujii et al.

(10) Patent No.: US 11,980,863 B2
(45) Date of Patent: May 14, 2024

(54) HEAT-EXPANDABLE MICROSPHERES AND APPLICATION THEREOF

(71) Applicant: MATSUMOTO YUSHI-SEIYAKU CO., LTD., Yao (JP)

(72) Inventors: Nobuaki Fujii, Yao (JP); Sachiko Tokumura, Yao (JP); Katsushi Miki, Yao (JP)

(73) Assignee: MATSUMOTO YUSHI-SEIYAKU CO., LTD., Yao (JP)

( * ) Notice: Subject to any disclaimer, the term of this patent is extended or adjusted under 35 U.S.C. 154(b) by 589 days.

(21) Appl. No.: 17/259,242

(22) PCT Filed: Jul. 5, 2019

(86) PCT No.: PCT/JP2019/026833
§ 371 (c)(1),
(2) Date: Jan. 11, 2021

(87) PCT Pub. No.: WO2020/017361
PCT Pub. Date: Jan. 23, 2020

(65) Prior Publication Data
US 2021/0275982 A1 Sep. 9, 2021

(30) Foreign Application Priority Data
Jul. 20, 2018 (JP) ................. 2018-136607

(51) Int. Cl.
*B01J 13/18* (2006.01)
*C08F 2/16* (2006.01)
*C08F 220/14* (2006.01)
*C08F 220/44* (2006.01)
*C09D 5/03* (2006.01)
*C09D 7/65* (2018.01)

(52) U.S. Cl.
CPC ............. *B01J 13/18* (2013.01); *C08F 2/16* (2013.01); *C08F 220/14* (2013.01); *C08F 220/44* (2013.01); *C09D 5/031* (2013.01); *C09D 7/65* (2018.01)

(58) Field of Classification Search
CPC . B01J 13/18; B01J 13/185; C08F 2/16; C08F 220/14; C08F 220/44; C08F 2/30; C08F 2/44; C08F 220/42; C09D 5/031; C09D 7/65; C09D 7/69; C09D 133/18; C09D 7/70; C09D 201/00; C08K 7/22; C08K 9/10; C08J 9/32; C08J 9/20; C09K 3/00
See application file for complete search history.

(56) References Cited

U.S. PATENT DOCUMENTS

| | | |
|---|---|---|
| 2011/0123807 A1 | 5/2011 | Jun et al. |
| 2011/0166242 A1 | 7/2011 | Kawaguchi et al. |
| 2012/0211912 A1 | 8/2012 | Kawaguchi et al. |
| 2013/0065975 A1 | 3/2013 | Natsui et al. |
| 2013/0065976 A1 | 3/2013 | Morita et al. |
| 2015/0322226 A1 | 11/2015 | Nordin |
| 2017/0335082 A1 | 11/2017 | Tokumura |

FOREIGN PATENT DOCUMENTS

| | | |
|---|---|---|
| JP | 2009-221429 A | 10/2009 |
| JP | 2009-540047 A | 11/2009 |
| JP | 2012-149173 A | 8/2012 |
| JP | 2015-003951 A | 1/2015 |
| JP | 2015-523908 A | 8/2015 |
| KR | 10-2011-0058095 A | 6/2011 |
| WO | 2007/091961 A1 | 8/2007 |
| WO | 2007/142593 A1 | 12/2007 |
| WO | 2011/122229 A1 | 10/2011 |
| WO | 2016/084612 A1 | 6/2016 |

OTHER PUBLICATIONS

International Search Report for PCT/JP2019/026833 dated Sep. 10, 2019 [PCT/ISA/210].
Office Action dated Oct. 5, 2021 for corresponding Swedish Patent application No. 2150169-7.
Office Action issued Feb. 22, 2024 by Korean Intellectual Property Office in Korean Application No. 10-2020-7035398.

*Primary Examiner* — Irina S Zemel
(74) *Attorney, Agent, or Firm* — Sughrue Mion, PLLC

(57) ABSTRACT

Heat-expandable microspheres containing a thermoplastic resin shell and a thermally-vaporizable blowing agent encapsulated therein. The thermoplastic resin is a polymer of a polymerizable component containing acrylonitrile, methacrylonitrile and acrylate ester and which satisfies specific conditions 1 and 2, where Condition 1: the amount of the acrylonitrile (A)<the amount of the methacrylonitrile (B), and Condition 2: the total amount of the acrylonitrile (A), the methacrylonitrile (B) and the acrylate ester (C) in the polymerizable component ranges from 61 to 100 wt %. Also disclosed are hollow resin particles manufactured by expanding the heat-expandable microspheres, a composition containing a base component and at least one selected from the heat-expandable microspheres and the hollow resin particles, and a formed article manufactured by forming or molding the composition.

14 Claims, 1 Drawing Sheet

HEAT-EXPANDABLE MICROSPHERES AND APPLICATION THEREOF

CROSS-REFERENCE TO RELATED APPLICATIONS

This application is a § 371 of International Application No. PCT/JP2019/026833 filed Jul. 5, 2019, claiming priority from Japanese Patent Application No. 2018-136607 filed Jul. 20, 2018.

BACKGROUND OF THE INVENTION

1. Field of the Invention

The present invention relates to heat-expandable microspheres and applications thereof.

2. Description of the Related Art

Heat-expandable microspheres, which contain a thermoplastic resin shell and a thermally vaporizable blowing agent encapsulated therein, are also referred to as heat-expandable microcapsules and are expandable by heating. The heat-expandable microspheres are employed in a wide range of applications, such as a designing additive for foamable inks or wallpapers and lightweight fillers for resins and paints owing to their heat-expandable property.

Chemical blowing agents are also widely used to foam or expand inks and resins. The chemical blowing agents decompose at a certain temperature to generate gas and foam or expand materials, such as inks. Although the chemical blowing agents enable instant production of highly foamed articles, the high amount of generated gas is a cause for concern about threats to environmental safety.

On the other hand, heat-expandable microspheres contain an internal blowing agent and expand themselves to attain a lightweight effect for materials. The better safety of the microspheres compared to chemical blowing agents have allowed them to be used in a wider range of applications and for materials in recent years as a substitute for chemical blowing agents.

Heat-expandable microspheres sometimes exhibit an inferior expansion ratio to that of chemical blowing agents, and heat-expandable microspheres with higher expansion performance have been developed.

For example, PTL 1 exemplifies heat-expandable microspheres having a high expansion performance, which contain a polymer shell made from ethylenically unsaturated monomer and encapsulating a propellant therein; wherein the ethylenically unsaturated monomer contains 20 to 80 wt % of acrylonitrile, 20 to 80 wt % of a monomer selected from the group consisting of acrylate esters, 0 to 10 wt % of methacrylonitrile and 0 to 40 wt % of a monomer selected form the group consisting of methacrylate esters; the total amount of the acrylonitrile and acrylate ester ranges from 50 to 100 wt % of the ethylenically unsaturated monomer; and the propellant contains at least one of methane, ethane, propane, isobutane, n-butane and isopentane.

Various uses of heat-expandable microspheres have been studied because of their convenience in handling and use as an agent to lighten materials processed by long-time heating has also been studied. Heat-expandable microspheres in such use, however, have posed a problem in that their expansion ratio changes with a change in heating time to cause a variation or change in expansion ratio and specific gravity of the resultant articles leading to an unstable quality of the articles.

Conventional heat-expandable microspheres like as those described in PTL 1 have insufficient expansion stability under varied heating time though they enabled the production of highly expanded articles by short-time heating.

For those reasons, there has been a demand for heat-expandable microspheres which do not significantly change their expansion ratio and specific gravity under varied heating times.

[PTL 1] International Publication 2007-091961

SUMMARY OF THE INVENTION

An object of the present invention is to provide heat-expandable microspheres and applications thereof which exhibit good expansion stability under varied heating times and with a minimum change in expansion ratio and specific gravity.

For solving the above-mentioned problems, and upon diligent study, the present inventors found that the heat-expandable microspheres, which contain a thermoplastic resin shell obtained by polymerizing a specific polymerizable component and a thermally-vaporizable blowing agent encapsulated in the shell, have a high blowing-agent retainability and high expansion stability under varied heating times and with a minimum change in expansion ratio and specific gravity, to thereby achieve the present invention.

More particularly, the present invention provides heat-expandable microspheres containing a thermoplastic resin shell and a thermally-vaporizable blowing agent encapsulated therein, wherein the thermoplastic resin is a polymer of a polymerizable component containing acrylonitrile (A), methacrylonitrile (B) and acrylate ester (C) and satisfies conditions 1 and 2 described below.

Condition 1: The amounts of the acrylonitrile (A) and the methacrylonitrile (B) in the polymerizable component satisfy the following formula (I).

$$\text{Amount of the acrylonitrile}(A) < \text{amount of the methacrylonitrile}(B) \quad \text{Formula (I)}$$

Condition 2: The total amount of the acrylonitrile (A), methacrylonitrile (B) and the acrylate ester (C) in the polymerizable component ranges from 61 to 100 wt %.

The heat-expandable microspheres of the present invention preferably satisfy at least one of the conditions 1) and 2) described below.

1) The amount of the acrylonitrile (A) ranges from 1 to 49 wt %, the amount of the methacrylonitrile (B) ranges from 5 to 80 wt % and the amount of the acrylate ester (C) ranges from 1 to 50 wt % of the polymerizable component.

2) The acrylate ester (C) is at least one selected from methyl acrylate, ethyl acrylate and n-butyl acrylate.

The present invention also provides hollow resin particles manufactured by expanding the heat-expandable microspheres described above.

The present invention further provides a composition containing a base component and at least one selected from the group consisting of the heat-expandable microspheres and hollow resin particles described above.

The composition of the present invention preferably satisfies at least one of conditions 3) and 4).

3) The composition is a liquid.

4) The composition is a paint composition.

Yet further, the present invention provides a formed article manufactured by forming or molding the composition.

3. Advantageous Effects of the Invention

The heat-expandable microspheres of the present invention have a high blowing-agent retainability that attains a minimum change in expansion ratio and specific gravity under varied heating times and thus exhibit good expansion stability.

The hollow resin particles of the present invention are manufactured from the heat-expandable microspheres described above and retain a constant specific gravity with minimum change under varied heating times.

The composition of the present invention contains at least one selected from the heat-expandable microspheres and hollow resin particles described above and can be processed into a formed article which is lightweight and has good expansion stability with a minimum change in expansion ratio and specific gravity under varied heating times.

The formed article of the present invention manufactured by forming the composition mentioned above is lightweight and has good expansion stability with a minimum change in expansion ratio and specific gravity with a change in heating time.

REFERENCE NUMERALS LIST

Figure 1:
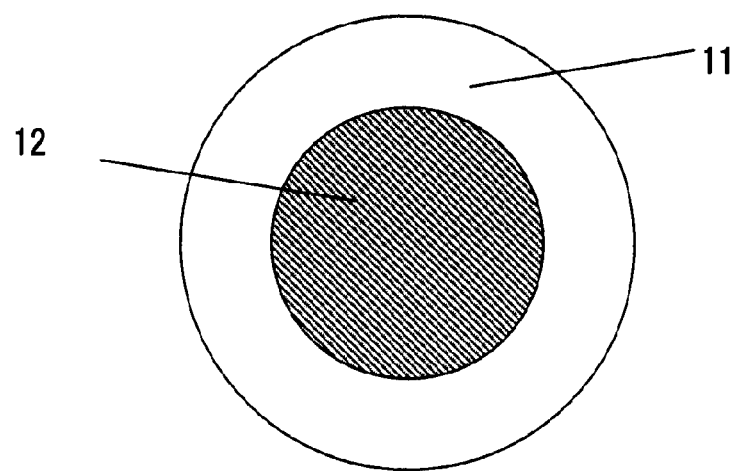
FIG. 1 is a schematic diagram of an example of the heat-expandable microspheres of the present invention

Reference numerals used to identify various features in the drawings include the following.
11 Thermoplastic resin shell
12 Blowing agent
1 Hollow resin particle (fine-particle-coated hollow resin particle)
2 Shell
3 Hollow part
4 Fine particle (in a state of adhesion)
5 Fine particle (in a state of being fixed in a dent)

DETAILED DESCRIPTION OF THE PREFERRED EMBODIMENTS

The present invention is next described in greater detail by reference to the drawings. However, the present invention should not be construed as being limited thereto.
Heat-Expandable Microspheres The heat-expandable microspheres of the present invention contain a thermoplastic resin shell 11 and a thermally-vaporizable blowing agent (core) 12 encapsulated therein as shown in FIG. 1. The heat-expandable microspheres have a core-shell structure and the whole of a microsphere is thermally expandable (a microsphere wholly expandable by heating). The thermoplastic resin is obtained by polymerizing the polymerizable component. The thermoplastic resin is a polymer of the polymerizable component.

The polymerizable component is polymerized into a thermoplastic resin which constitutes the shell of the heat-expandable microspheres. The polymerizable component essentially contains a monomer having one radically reactive carbon-carbon double bond per molecule and can contain a cross-linking agent having at least two radically reactive carbon-carbon double bonds per molecule. Both the monomer and crosslinking agent can react in addition polymerization and the crosslinking agent introduces a crosslinking structure in the thermoplastic resin.

The polymerizable component contains acrylonitrile (A) (hereinafter also referred to as the monomer (A)), methacrylonitrile (B) (hereinafter also referred to as the monomer (B)) and acrylate ester (C) (hereinafter also referred to as the monomer (C)) and satisfies conditions 1 and 2 described below. The thermoplastic resin obtained by polymerizing the polymerizable component which satisfies these conditions has the properties of gas barrier effect, rigidity, elasticity in heated and softened state and drawability owing to the molecular structure of the polymer constituting the resin. The properties of the thermoplastic resin are well-balanced to contribute to the production of heat-expandable microspheres which can control the release of vaporized blowing agent through their shell to the outside so as to exhibit a high blowing-agent retainability and good expansion stability with a minimum change in their expansion ratio and specific gravity with a change in heating time.

Condition 1: The amounts of the acrylonitrile (A) and the methacrylonitrile (B) in the polymerizable component satisfy the following formula (I).

$$\text{Amount of the acrylonitrile}(A) < \text{amount of the methacrylonitrile}(B) \quad \text{Formula (I)}$$

If the amounts of the monomer (A) and the monomer (B) in the polymerizable component are not in the relation represented by the formula (I) shown in Condition 1, in other words, the amounts are in the relation of an amount of the monomer (A)≥amount of the monomer (B), the resultant polymer has excessive rigidity and is manufactured into heat-expandable microspheres which exhibit poor blowing-agent retainability and inferior expansion stability to significantly change their expansion ratio and specific gravity with a change in heating time.

Condition 2: The total amounts of the acrylonitrile (A), the methacrylonitrile (B) and the acrylate ester (C) in the polymerizable component range from 61 to 100 wt %.

If the total amount of the monomer (A), the monomer (B) and the monomer (C) in the polymerizable component is lower than 61 wt %, the resultant thermoplastic resin has a poor gas barrier effect and is processed into heat-expandable microspheres which exhibit poor blowing-agent retainability and significantly change their expansion ratio and true specific gravity with a change in heating time so as to have poor expansion stability. The upper limit of the total amounts of the monomer (A), the monomer (B) and the monomer (C) is preferably (1) 99.95 wt %, (2) 99.5 wt %, (3) 99 wt %, (4) 98.5 wt % or (5) 98 wt % (where a greater number in the parentheses indicates a more preferable upper limit). On the other hand, the lower limit of the total amounts of the monomer (A), the monomer (B) and the monomer (C) is preferably (1) 65 wt %, (2) 70 wt %, (3) 75 wt %, (4) 80 wt %, (5) 86 wt %, (6) 88 wt % or (7) 91 wt % (where a greater number in the parentheses indicates a more preferable lower limit).

The amount of the monomer (A) in the polymerizable component is not specifically restricted and preferably ranges from 1 to 49 wt %. An amount of the monomer (A) lower than 1 wt % decreases the rigidity of the resultant thermoplastic resin, and the resultant microspheres cannot encapsulate a blowing agent. On the other hand, an amount of the monomer (A) higher than 49 wt % causes excessive rigidity of the resultant thermoplastic resin constituting the shell of heat-expandable microspheres and can cause poor blowing-agent retainability of the resultant microspheres. The upper limit of the amount of the monomer (A) is preferably (1) 45 wt %, (2) 43 wt %, (3) 40 wt %, (4) 39 wt % or (5) 35 wt % (where a greater number in the parentheses indicates a more preferable upper limit). On the other hand, the lower limit of the amount of the monomer (A) is preferably (1) 5 wt %, (2) 7 wt %, (3) 10 wt % or (4) 15 wt % (where a greater number in the parentheses indicates a more preferable lower limit).

The amount of the monomer (B) in the polymerizable component is not specifically restricted and preferably ranges from 5 to 80 wt %. An amount of the monomer (B) lower than 5 wt % decreases the gas barrier effect of the resultant thermoplastic resin and can lead to poor blowing-agent retainability of the resultant microspheres. On the other hand, an amount of the monomer (B) higher than 80 wt % impairs the drawability of the resultant thermoplastic resin when heated and softened, and heat-expandable microspheres having such a thermoplastic resin shell can exhibit poor expansion performance. The upper limit of the amount of the monomer (B) is preferably (1) 75 wt %, (2) 70 wt % or (3) 65 wt % (where a greater number in the parentheses indicates more a preferable upper limit). On the other hand, the lower limit of the amount of the monomer (B) is preferably (1) 10 wt %, (2) 15 wt %, (3) 20 wt % (4) 30 wt %, (5) 35 wt % (6) 41 wt % or (7) 42 wt % (where a greater number in the parentheses indicates a more preferable lower limit).

The weight ratio of the monomer (A) and the monomer (B) ((B)/(A)) in the polymerizable component preferably ranges from 1.01 to 50 to attain the effect of the present invention. The upper limit of the weight ratio of the monomer (A) and the monomer (B) is preferably (1) 30, (2) 20, (3) 10 or (4) 5 (where a greater number in the parentheses indicates a more preferable upper limit). On the other hand, the lower limit of the weight ratio of the monomer (A) and the monomer (B) is preferably (1) 1.03, (2) 1.05, (3) 1.07 or (4) 1.1 (where a greater number in the parentheses indicates a more preferable lower limit).

The acrylate ester (C) includes, for example, methyl acrylate, ethyl acrylate, n-butyl acrylate, t-butyl acrylate, isobutyl acrylate, 2-ethylhexyl acrylate, lauryl acrylate, stearyl acrylate, phenyl acrylate, isobornyl acrylate, cyclohexyl acrylate, benzyl acrylate, 2-hydroxyethyl acrylate and 2-hydroxypropyl acrylate. Of those monomers (C), methyl acrylate, ethyl acrylate and n-butyl acrylate are preferable to attain the effect of the present invention. One of or a combination of at least two of the monomers (C) can be used.

The amount of the monomer (C) in the polymerizable component is not specifically restricted and preferably ranges from 1 to 50 wt %. An amount of the monomer (C) lower than 1 wt % impairs the elasticity of the resultant thermoplastic resin when it is heated and softened, and heat-expandable microspheres having such a thermoplastic resin shell can exhibit poor expansion performance. An amount of the monomer (C) higher than 50 wt % decreases the gas barrier effect of the resultant thermoplastic resin and the resultant microspheres can exhibit poor blowing-agent retainability. The upper limit of the amount of the monomer (C) is preferably (1) 45 wt %, (2) 40 wt %, (3) 35 wt % or (4) 30 wt % (where a greater number in the parentheses indicates a more preferable upper limit). On the other hand, the lower limit of the amount of the monomer (C) is preferably (1) 4 wt %, (2) 7 wt %, (3) 10 wt % (4) 13 wt %, (5) 15 wt % or (6) 18 wt % (where a greater number in the parentheses indicates a more preferable lower limit).

The weight ratio of the monomer (A) and the monomer (C) ((C)/(A)) in the polymerizable component preferably ranges from 0.02 to 40 to attain the effect of the present invention. The upper limit of the weight ratio of the monomer (A) and the monomer (C) is preferably (1) 20, (2) 10 or (3) 5 (where a greater number in the parentheses indicates a more preferable upper limit). On the other hand, the lower limit of the weight ratio of the monomer (A) and the monomer (C) is preferably (1) 0.05, (2) 0.10, (3) 0.15 or (4) 0.20 (where a greater number in the parentheses indicates a more preferable lower limit).

The polymerizable component can contain the monomer (D), which is a monomer other than the monomer (A), monomer (B) and monomer (C) and has one carbon-carbon double bond per molecule.

The monomer (D) is not specifically restricted and includes, for example, nitrile monomers other than acrylonitrile and methacrylonitrile, such as fumaronitrile and maleonitrile; methacrylate esters, such as methyl methacrylate, ethyl methacrylate, n-butyl methacrylate, t-butyl methacrylate, isobutyl methacrylate, 2-ethylhexyl methacrylate, lauryl methacrylate, stearyl methacrylate, phenyl methacrylate, isobornyl methacrylate, cyclohexyl methacrylate, benzyl methacrylate, 2-hydroxyethyl methacrylate and 2-hydroxypropyl methacrylate; vinyl halide monomers, such as vinyl chloride; vinylidene halide monomers, such as vinylidene chloride; carboxyl-group-containing monomers, such as unsaturated monocarboxylic acids including acrylic acid, methacrylic acid, ethacrylic acid, crotonic acid and cinnamic acid, unsaturated dicarboxylic acids including maleic acid, itaconic acid, fumaric acid, citraconic acid and chloromaleic acid, anhydrides of unsaturated dicarboxylic acids, and monoesters of unsaturated dicarboxylic acids including monomethyl maleate, monoethyl maleate, monobutyl maleate, monomethyl fumarate, monoethyl fumarate, monomethyl itaconate, monoethyl itaconate and monobutyl itaconate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ester monomers, such as vinyl acetate, vinyl propionate, vinyl butyrate and vinyl pivalate; vinyl ketone monomers, such as vinyl methyl ketone; N-vinyl monomers, such as N-vinyl carbazole and N-vinyl pyrolidone; and vinyl naphthalene salts. A part of or the whole of the carboxyl groups of the carboxyl-group-containing monomers can be neutralized during or after the polymerization. The term (meth)acryl mentioned herein means acryl or methacryl. One of or a combination of at least two of the monomers (D) can be used.

The amount of the monomer (D) in the polymerizable component is not specifically restricted and is preferably not higher than 39 wt %. The upper limit of the amount of the monomer (D) is preferably (1) 30 wt %, (2) 20 wt % or (3) 9 wt % (where a greater number in the parentheses indicates a more preferable upper limit). On the other hand, the lower limit of the amount of the monomer (C) is preferably 0 wt %.

Of those monomers (D), at least one monomer selected from methacrylate esters and vinyl ester monomers is preferable to impart sufficient elasticity and drawability to the thermoplastic resin constituting the shell of heat-expandable microspheres so as to improve expansion performance of the microspheres. Among the monomers, methyl methacrylate is more preferable than other methacrylate esters, and vinyl acetate is more preferable than other vinyl esters.

The polymerizable component containing a carboxyl-group-containing monomer as the monomer (D) contributes to improved heat resistance of the resultant heat-expandable microspheres. The amount of the carboxyl-group-containing monomer in the polymerizable component is preferably not higher than 20 wt %. The upper limit of the amount of the carboxyl-containing monomer is preferably (1) 14 wt %, (2) 9 wt % or (3) 5 wt % (where a greater number in the parentheses indicates a more preferable upper limit). On the other hand, the lower limit of the amount of the carboxyl-group-containing monomer is preferably 0 wt %.

The polymerizable component can contain a cross-linking agent as mentioned above. Polymerization with the cross-linking agent improves the gas barrier effect of the thermoplastic resin constituting the shell of heat-expandable microspheres, and improves its elasticity in a heated and softened state so as to enable production of heat-expandable microspheres having a high expansion performance.

The cross-linking agent is not specifically restricted and includes, for example, alkane diol di(meth)acrylates, such as ethylene glycol di(meth)acrylate, 1,4-butanediol di(meth) acrylate, 1,6-hexanediol di(meth)acrylate, 1,9-nonanediol di(meth)acrylate, 1,10-decanediol di(meth)acrylate, neopentylglycol di(meth)acrylate, 3-methyl-1,5 pentanediol di(meth)acrylate and 2-methyl-1,8 octanediol di(meth)acrylate; polyalkylene glycol di(meth)acrylate, such as diethylene glycol di(meth)acrylate, triethylene glycol di(meth)acrylate, PEG (200) di(meth)acrylate, PEG (400) di(meth)acrylate, PEG (600) di(meth)acrylate, PEG (1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, polytetramethylene glycol di(meth)acrylate, polytetramethylene glycol (650) di(meth)acrylate and ethoxylated polypropylene glycol (700) di(meth)acrylate; and bifunctional, trifunctional, tetrafunctional or polyfunctional cross-linkable monomers, such as ethoxylated bisphenol A di(meth)acrylate (with 2 to 30 moles of EO), propoxylated bisphenol A di(meth)acrylate, propoxylated ethoxylated bisphenol A di(meth)acrylate, glycerin di(meth)acrylate, 2-hydroxy-3-acryloyloxypropyl methacrylate, dimethylol-tricyclodecane di(meth)acrylate, divinylbenzene, ethoxylated glycerin triacrylate, 1,3,5-tri(meth)acryloylhexahydro-1,3,5-triazine, triaryl isocyanurate, pentaerythritol tri(meth)acrylate, trimethylolpropane tri(meth)acrylate, 1,2,4-trivinyl benzene, ditrimethylolpropane tetra(meth)acrylate, pentaerythritol tetra(meth)acrylate and dipentaerythritol hexa(meth)acrylate. One of or a combination of at least two of the cross-linking agents can be used.

Although the cross-linking agent cannot be contained in the polymerizable component, the amount of the cross-linking agent in the polymerizable component is not specifically restricted and is preferably not higher than 6 wt %. The polymerizable component containing the cross-linking agent in an amount higher than 6 wt % can cause excessive rigidity of the polymerized thermoplastic resin to impair the blowing-agent retainability of the resultant heat-expandable microspheres. The upper limit of the amount of the cross-linking agent is preferably (1) 5 wt %, (2) 3 wt % (3), 2 wt % or (4) 1 wt % (where a greater number in the parentheses indicates a more preferable upper limit). On the other hand, the lower limit of the amount of the cross-linking agent is preferably 0 wt %.

The blowing agent vaporizes by heating and the blowing agent encapsulated in the thermoplastic resin shell of heat-expandable microspheres makes the whole of a microsphere thermally expandable (a microsphere wholly expandable by heating).

The blowing agent is not specifically restricted and includes, for example, hydrocarbons having a carbon number ranging from 3 to 13, such as methane, ethane, propane, (iso)butane, (iso)pentane, (iso)hexane, (iso)heptane, (iso) octane, (iso)nonane, (iso)decane, (iso)undecane, (iso)dodecane and (iso)tridecane; hydrocarbons having a carbon number greater than 13 and not greater than 20, such as (iso) hexadecane and (iso)eicosane; hydrocarbons from petroleum fractions, such as pseudocumene, petroleum ether, and normal paraffins and isoparaffins having an initial boiling point ranging from 150 to 260° C. and/or being distilled in the temperature range from 70 to 360° C.; halides of $C_1$-$C_{12}$ hydrocarbons, such as methyl chloride, methylene chloride, chloroform and carbon tetrachloride; fluorine-containing compounds, such as hydrofluoroether; silanes having $C_1$-$C_5$ alkyl groups, such as tetramethyl silane, trimethylethyl silane, trimethylisopropyl silane and trimethyl-n-propyl silane; and compounds which thermally decompose to generate gases, such as azodicarbonamide, N,N'-dinitrosopentamethylenetetramine and 4,4'-oxybis(benzenesulfonyl hydrazide).

The blowing agent can be composed of one of or a combination of at least two of those compounds. The blowing agent can be any of a linear, branched or alicyclic compound, and is preferably an aliphatic compound.

Of those blowing agents, hydrocarbons having 5 or a lower number of carbon atoms are preferable to improve the expansion performance of heat-expandable microspheres. Hydrocarbons having at least 6 carbon atoms contribute to an increased expansion-starting temperature and maximum expansion temperature of heat-expandable microspheres. Isobutene and isopentane are preferable hydrocarbons having 5 or a lower number of carbon atoms, while isooctane is a preferable hydrocarbon having at least 6 carbon atoms.

The blowing agent preferably contains a hydrocarbon having 4 or a lower number of carbon atoms, especially isobutane for attaining the effect of the present invention.

The encapsulation ratio of the blowing agent in the heat-expandable microspheres is defined as the weight percentage of the blowing agent encapsulated in the heat-expandable microspheres to the weight of the heat-expandable microspheres.

The encapsulation ratio of the blowing agent in the heat-expandable microspheres is not specifically restricted and preferably ranges from 1 to 50 wt %. An encapsulation ratio within the above range attains a high internal pressure of the heat-expandable microcapsules by heating to enable a high expansion of the heat-expandable microspheres. The lower limit of the encapsulation ratio of the blowing agent is preferably (1) 5 wt % or (2) 10 wt % (where a greater number in the parentheses indicates a more preferable lower limit). On the other hand, the upper limit of the encapsulation ratio of the blowing agent is preferably (1) 40 wt % or (2) 30 wt % (where a greater number in the parentheses indicates a more preferable upper limit).

The expansion-starting temperature ($T_s$) of the heat-expandable microspheres is not specifically restricted and preferably ranges from 50 to 200° C. for attaining the effect of the present invention. The upper limit of the expansion-starting temperature is preferably (1) 170° C., (2) 160° C., (3) 150° C., (4) 140° C., (5) 135° C., (6) 130° C., (7) 125° C., (8) 120° C., (9) 115° C., (10) 110° C., (11) 105° C., (12) 103° C., (13) 101° C. or (12) 99° C. (where a greater number in the parentheses indicates a more preferable upper limit). On the other hand, the lower limit of the expansion-starting temperature is preferably (1) 55° C., (2) 60° C., (3) 65° C. or (4) 70° C. (where a greater number in the parentheses indicates a more preferable lower limit).

The maximum expansion temperature ($T_{max}$) of the heat-expandable microspheres is not specifically restricted, and preferably ranges from 95° C. to 270° C. for attaining the effect of the present invention. The upper limit of the maximum expansion temperature is preferably (1) 240° C., (2) 220° C., (3) 200° C., (4) 190° C., (5) 180° C., (6) 170° C., (7) 165° C., (8) 160° C. or (9) 155° C. (where a greater number in the parentheses indicates a more preferable upper limit). The lower limit of the maximum expansion temperature is preferably (1) 100° C. or (2) 105° C. (where a greater number in the parentheses indicates a more preferable lower limit).

The expansion-starting temperature ($T_s$) and the maximum expansion temperature ($T_{max}$) of the heat-expandable microspheres are determined by the procedures described in the Examples below.

The volume mean particle size (hereinafter also referred to as a mean particle size) (D50) of the heat-expandable microspheres is not specifically restricted and preferably ranges from 1 to 200 µm in order to improve the expansion performance of the heat-expandable microspheres. Heat-expandable microspheres having a mean particle size smaller than 1 µm can have thin shell having an insufficient gas barrier effect and insufficient rigidity, and can cause poor expansion performance. On the other hand, heat-expandable microspheres having a mean particle size greater than 200 µm can have an excessively rigid shell which can also cause poor expansion performance.

The upper limit of the volume mean particle size is preferably (1) 150 µm, (2) 100 µm, (3) 70 µm, (4) 60 µm, (5) 50 µm or (6) 45 µm (where a greater number in the parentheses indicates a more preferable upper limit). On the other hand, the lower limit of the mean volume particle size is preferably (1) 3 µm, (2) 5 µm, (3) 10 µm, (4) 12 µm, (5) 15 µm, (6) 18 µm or (7) 20 µm (where a greater number in the parentheses indicates a more preferable lower limit).

The volume mean particle size is determined by the procedure described in the Examples below.

The coefficient of variation, CV, of the particle size distribution of the heat-expandable microspheres is not specifically restricted, and is preferably (1) not greater than 50%, (2) not greater than 40%, (3) not greater than 35% or (4) not greater than 30% (where a greater number in the parentheses indicates a more preferable CV). The CV can be calculated by the following formulae (1) and (2).

$$CV = (s/<x>) \times 100(\%) \quad (1)$$

$$s = \left\{ \sum_{i=1}^{n} (xi - <x>)^2 / (n-1) \right\}^{1/2} \quad (2)$$

(where s is a standard deviation of the particle size of the microspheres, <x> is a mean particle size of the microspheres, "xi" is the particle size of the i-th microsphere, and n represents the number of microspheres)

The maximum expansion ratio of the heat-expandable microspheres is not specifically restricted, and is preferably at least 30 times. The lower limit of the maximum expansion ratio of the heat-expandable microspheres is preferably (1) 50 times, (2) 80 times, (3) 100 times or (4) 150 times (where a greater number in the parentheses indicates a more preferable lower limit). On the other hand, the upper limit of the maximum expansion ratio of the heat-expandable microspheres is preferably 500 times. The maximum expansion ratio of the heat-expandable microspheres is determined by the procedure described in the Examples below.

As mentioned above, the heat-expandable microspheres of the present invention contain a shell of thermoplastic resin obtained by polymerizing a specific polymerizable component and a blowing agent encapsulated in the shell, and have high blowing-agent retainability. The heat-expandable microspheres having a high blowing-agent retainability stably expand under varied heating times with a minimum change in their expansion ratio and specific gravity, in other words, exhibit good expansion stability.

The blowing-agent retainability mentioned herein can be evaluated by determining the change in the weight of the heat-expandable microspheres by a TGA (thermogravimetry analyzer), and calculating the temperature range where a blowing agent is retained in heat-expandable microspheres. Heat-expandable microspheres retaining a blowing agent in a wider temperature range have better blowing-agent retainability and minimize the change in their expansion ratio and true specific gravity under varied heating times.

The blowing-agent retainability of heat-expandable microspheres is represented by the difference between the blowing agent release-starting temperature, $T_R$ (° C.), and the blowing agent release-ending temperature, $T_E$ (° C.) as represented by the formula, $(T_E - T_R) = \Delta T$. A greater $\Delta T$ means that the heat-expandable microspheres have good expansion stability to continue expansion for a longer period of time with minimum influence by heating times.

The $\Delta T$ is not specifically restricted and is preferably at least 60° C. for attaining the effect of the present invention. The lower limit of the $\Delta T$ is preferably (1) 65° C., (2) 70° C., (3) 75° C. or (4) 80° C. (where a greater number in the parentheses indicates a more preferable lower limit). The preferable upper limit of the $\Delta T$ is 200° C.

The $\Delta T$ of heat-expandable microspheres is determined by the method described in the Examples below.

Process for Producing Heat-Expandable Microspheres

The process for producing heat-expandable microspheres of the present invention includes the step of dispersing an oily mixture containing a polymerizable component, a blowing agent and a polymerization initiator in an aqueous dispersion medium and polymerizing the polymerizable component (hereinafter also referred to as the polymerization step).

The polymerization initiator is not specifically restricted, and includes peroxides and azo compounds.

The peroxides include, for example, peroxidicarbonates, such as diisopropyl peroxydicarbonate, di-sec-butyl peroxydicarbonate, di-2-ethylhexyl peroxydicarbonate and dibenzyl peroxydicarbonate; diacyl peroxides, such as lauroyl peroxide and benzoyl peroxide; ketone peroxides, such as methyl ethyl ketone peroxide and cyclohexanone peroxide; peroxy ketals, such as 2,2-bis(t-butylperoxy) butane; hydroperoxides, such as cumene hydroperoxide and t-butyl hydroperoxide; dialkyl peroxides, such as dicumyl peroxide and di-t-butyl peroxide; and peroxyesters, such as t-hexyl peroxypivalate, t-butyl peroxypivalate and t-butyl peroxyisobutyrate.

The azo compound includes, for example, 2,2'-azobis(4-methoxy-2,4-dimethyl valeronitrile), 2,2'-azobisisobutylonitrile, 2,2'-azobis(2,4-dimethyl valeronitrile), 2,2'-azobis(2-methyl propionate), 2,2'-azobis(2-methylbutylonitrile) and 1,1'-azobis(cyclohexane-1-carbonitrile).

The amount of the polymerization initiator in the polymerizable component preferably ranges from 0.03 to 12 parts by weight to 100 parts by weight of the polymerizable component. The upper limit of the amount of the polymerization initiator is preferably (1) 10 parts by weight, (2) 8 parts by weight or (3) 5 parts by weight (where a greater number in the parentheses indicates a more preferable upper limit). On the other hand, the lower limit of the amount of the polymerization initiator is preferably (1) 0.05 parts by weight, (2) 0.1 parts by weight or (3) 0.2 parts by weight (where a greater number in the parentheses indicates a more preferable lower limit). An amount of the polymerization initiator beyond the ranges mentioned above can decrease the gas barrier effect, rigidity and drawability of the resultant thermoplastic resin and also decrease the elasticity of the resin when heated and softened, and the resultant heat-expandable microspheres can have a poor blowing-agent retainability. One of or a combination of at least two of the polymerization initiators can be used.

The process for producing the heat-expandable microspheres of the present invention contains the steps of preparing an aqueous suspension by dispersing an oily mixture in an aqueous dispersion medium and polymerizing the polymerizable component.

The aqueous dispersion medium contains water, such as deionized water, as the main component, and the oily mixture is dispersed therein. The aqueous dispersion medium can further contain alcohols, such as methanol, ethanol and propanol, and hydrophilic organic solvents, such as acetone. The hydrophilic property mentioned in the present invention means the property of a substance optionally miscible in water. The amount of the aqueous dispersion medium used in the step is not specifically restricted, and preferably ranges from 100 to 1000 parts by weight to 100 parts by weight of the polymerizable component.

The aqueous dispersion medium can further contain an electrolyte, such as sodium chloride, magnesium chloride, calcium chloride, sodium sulfate, magnesium sulfate, ammonium sulfate and sodium carbonate. One of or a combination of at least two of these electrolytes can be used. The amount of the electrolyte is not specifically restricted, and preferably ranges from 0 to 50 parts by weight to 100 parts by weight of the aqueous dispersion medium.

The aqueous dispersion medium can contain at least one water-soluble compound selected from among polyalkylene imines having a nitrogen atom bonded with an alkyl group substituted with a hydrophilic functional group selected from carboxylic acid (salt) groups and phosphonic acid (salt) groups, and water-soluble 1,1-substitution compounds having a carbon atom bonded with a hetero atom and with a hydrophilic functional group selected from hydroxyl group, carboxylic acid (salt) groups and phosphonic acid (salt) groups, potassium dichromate, alkali metal nitrite salts, metal (III) halides, boric acid, water-soluble ascorbic acids, water-soluble polyphenols, water-soluble vitamin Bs, water-soluble phosphonic acids and phosphonate salts. The term "water-soluble" as used herein means that at least 1 g of a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component. The upper limit of the amount of the water-soluble compound is preferably (1) 0.5 parts by weight, (2) 0.1 parts by weight or (3) 0.05 parts by weight (where a greater number in the parentheses indicates a more preferable upper limit). On the other hand, the lower limit of the amount of the water-soluble compound is preferably (1) 0.0003 parts by weight or (2) 0.001 parts by weight (where a greater number in the parentheses indicates a more preferable lower limit).

The aqueous dispersion medium can contain a dispersion stabilizer or dispersion stabilizing auxiliary in addition to the electrolytes and water-soluble compounds.

The dispersion stabilizer is not specifically restricted, and includes, for example, calcium triphosphate, magnesium pyrophosphate and calcium pyrophosphate produced by double reaction, colloidal silica, alumina sol and magnesium hydroxide. One of or a combination of at least two of those dispersion stabilizers can be used.

The amount of the dispersion stabilizer preferably ranges (1) from 0.05 to 100 parts by weight or (2) from 0.2 to 70 parts by weight to 100 parts by weight of the polymerizable component (where a greater number in the parentheses indicates a preferable amount).

The dispersion stabilizing auxiliary is not specifically restricted, and includes, for example, polymeric dispersion stabilizing auxiliaries, and surfactants, such as cationic surfactants, anionic surfactants, amphoteric surfactants and nonionic surfactants. One of or a combination of at least two of those dispersion stabilizing auxiliaries can be used.

The aqueous dispersion medium is prepared, for example, by optionally selecting and blending electrolytes, water-soluble compounds, dispersion stabilizers and dispersion stabilizing auxiliaries with water (deionized water). The pH of the aqueous dispersion medium for polymerization is adjusted according to the types of the water-soluble compounds, dispersion stabilizers and dispersion stabilizing auxiliaries.

The polymerization can be conducted in the presence of sodium hydroxide or the combination of sodium hydroxide and zinc chloride.

In the production process of the present invention, the oily mixture is dispersed and suspended in the aqueous dispersion medium to be formed into oil globules of a prescribed particle size.

The methods for dispersing and suspending the oily mixture include generally known dispersion methods, such as agitation with a Homo-mixer (for example, a device manufactured by Primix Corporation), dispersion with a static dispersing apparatus such as a Static mixer (for example, a device manufactured by Noritake Engineering Co., Ltd.), membrane emulsification technique and ultrasonic dispersion.

Then suspension polymerization is started by heating the dispersion in which the oily mixture is dispersed into oil globules in the aqueous dispersion medium. During the polymerization reaction, the dispersion is preferably agitated gently to prevent floating of monomers and sedimentation of polymerized heat-expandable microspheres.

The polymerization temperature can be set optionally depending on the type of the polymerization initiator, and is preferably controlled within the range (1) from 30 to 90° C. or (2) from 40 to 88° C. (where a greater number in the parentheses indicates a more preferable temperature range). The polymerization temperature is preferably maintained for about 1 to 20 hours. The initial pressure for the polymerization is not specifically restricted, and is preferably controlled within the range (1) from 0 to 5 MPa or (2) from 0.2 to 3 MPa in gauge pressure (where a greater number in the parentheses indicates a more preferable pressure range).

The resultant slurry is filtered with a centrifugal separator, press filter or suction extractor to be processed into wet powder. The moisture content of the wet powder is not specifically restricted and preferably ranges (1) from 10 to 50 wt %, (2) from 15 to 45 wt % or (3) from 20 to 40 wt % (where a greater number in the parentheses indicates a more preferable moisture content range). The wet powder is dried in a tray drier, indirect heating oven, fluidized bed dryer, vacuum dryer, vibration dryer or flash dryer to be prepared into a dry powder. The moisture content of the dry powder is preferably (1) not higher than 5 wt %, (2) not higher than 3 wt % or (3) not higher than 1 wt % (where a greater number in the parentheses indicates a more preferable moisture content).

The wet powder or dry powder can be washed with water and/or redispersed in water, filtered again and dried for the purpose of decreasing the content of the ionic substances. The slurry can also be dried with a spray dryer or fluidized bed dryer to be processed into a dry powder.

The wet powder and dry powder can be selected according to the use.

Hollow Resin Particles

The hollow resin particles of the present invention are manufactured by thermally expanding the heat-expandable microspheres produced in the process mentioned above. The hollow resin particles are lightweight and exhibit excellent material properties when contained in a composition or formed article.

The hollow resin particles of the present invention are manufactured by thermally expanding the heat-expandable microspheres produced in the process mentioned above. The hollow resin particles contain a thermoplastic resin shell which is a polymer of a specific polymerizable component and retain a constant specific gravity with minimum change under varied heating times.

The hollow resin particles of the present invention are manufactured from the heat-expandable microspheres produced in the process mentioned above by thermally expanding the microspheres at a temperature preferably ranging from 50 to 400° C. The thermal expansion process is not specifically restricted, and either dry thermal expansion or wet thermal expansion can be employed.

The mean particle size of the hollow resin particles can be optionally designed according to their application and is not specifically restricted, although the mean particle size preferably ranges from 3 to 1000 μm. The upper limit of the mean particle size of the hollow resin particles is preferably (1) 500 μm or (2) 300 μm (where a greater number of the parentheses indicates a more preferable upper limit). On the other hand, the lower limit of the mean particle size of the hollow resin particles is preferably (1) 10 μm, (2) 15 μm or (3) 30 μm (where a greater number of the parentheses indicates a more preferable lower limit).

The coefficient of variation, CV, of the particle size distribution of the hollow resin particles is not specifically restricted, and is preferably (1) not greater than 50%, (2) not greater than 40%, (3) not greater than 35% or (4) not greater than 30% (where a greater number in the parentheses indicates a more preferable CV).

The true specific gravity of the hollow resin particles is not specifically restricted and preferably ranges from 0.001 to 0.6 for attaining the effect of the present invention. The upper limit of the true specific gravity of the hollow resin particles is preferably (1) 0.4 or (2) 0.3 (where a greater number in the parentheses indicates a more preferable upper limit). On the other hand, the lower limit of the true specific gravity of the hollow resin particles is preferably (1) 0.0015 or (2) 0.002 (where a greater number in the parentheses indicates a more preferable lower limit). Hollow resin particles having a true specific gravity lower than 0.001 can change their specific gravity significantly with a change in heating time and cannot retain a constant specific gravity. On the other hand, hollow resin particles having a true specific gravity higher than 0.6 have a poor effect of decreasing the specific gravity of materials containing the particles. Thus, a high amount of such hollow resin particles is required to prepare a composition for a lightweight article, and such a high amount can impair the properties of the composition and resultant formed articles.

Figure 2:
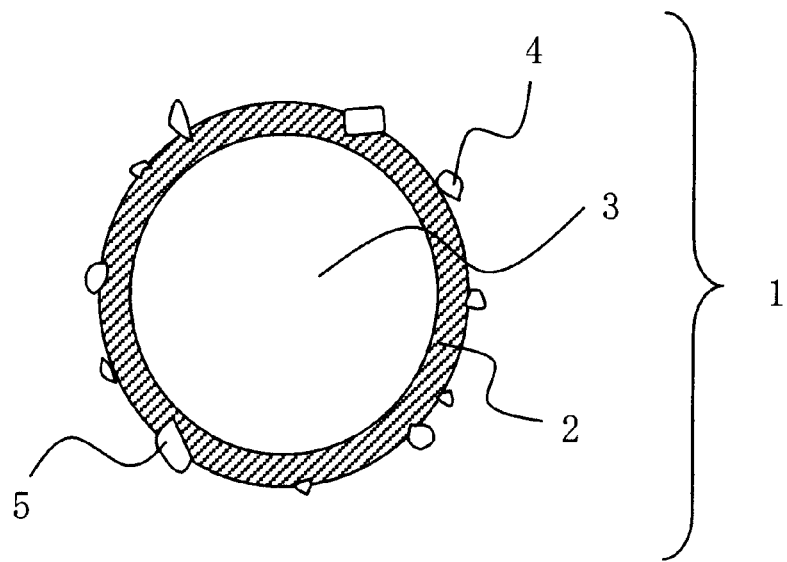
FIG. 2 is a schematic diagram of an example of the hollow resin particles of the present invention

As shown in FIG. 2, the hollow resin particles (1) can contain the fine particles (4 and 5) coating the outer surface of the shell (2) of the particles, and such particles are also referred to as fine-particle-coated hollow resin particles.

The coating mentioned herein means that the fine particles (4 and 5) is in a state of adhesion (the state of the fine particle 4 in FIG. 2) on the outer surface of the shell 2 of the fine-particle-coated hollow resin particles, or in a state of fixation (the state of the fine particle 5 in FIG. 2) in a dent on the outer surface of the shell as the result of the fine particles embedding into the thermoplastic resin shell softened or melted by heating. The shape of the fine particles can be irregular or spherical.

The fine particles coating the hollow resin particles prevent scattering of the hollow resin particles to improve their handling property and improve their dispersibility in a base component, such as binders and resins.

The fine particles can be selected from various materials including both inorganic and organic materials. The shape of the fine particles includes spherical, needle-like and plate-like shapes.

The inorganic compounds constituting the fine particles are not specifically restricted, and include, for example, wollastonite, sericite, kaolin, mica, clay, talc, bentonite, aluminum silicate, pyrophyllite, montmorillonite, calcium silicate, calcium carbonate, magnesium carbonate, dolomite, calcium sulfate, barium sulfate, glass flake, boron nitride, silicon carbide, silica, alumina, isinglass, titanium dioxide, zinc oxide, magnesium oxide, hydrotalcite, carbon black, molybdenum disulfide, tungsten disulfide, ceramic beads, glass beads, crystal beads and glass microballoons.

The organic compounds constituting the fine particles are not specifically restricted, and include, for example, sodium carboxymethyl cellulose, hydroxyethyl cellulose, methyl cellulose, ethyl cellulose, nitro cellulose, hydroxypropyl cellulose, sodium alginate, polyvinyl alcohol, polyvinyl pyrolidone, sodium polyacrylate, carboxyvinyl polymer, polyvinyl methyl ether, magnesium stearate, calcium stearate, zinc stearate, polyethylene wax, lauric amide, myristic amide, palmitic amide, stearic amide, hydrogenated castor oil, (meth)acrylic resin, polyamide resin, silicone resin, urethane resin, polyethylene resin, polypropylene resin and fluorine resin.

The inorganic and organic compounds constituting the fine particles can be surface-treated with a surface-treatment agent, such as a silane coupling agent, paraffin wax, fatty acid, resin acid, urethane compound and fatty acid ester, or need not be surface-treated.

The mean particle size of the fine particles is not specifically restricted and preferably ranges (1) from 0.001 to 30 μm, (2) from 0.005 to 25 μm or (3) from 0.01 to 20 μm (where a greater number in the parentheses indicates a more preferable mean particle size). The mean particle size of the fine particles mentioned herein is determined by laser diffractometry.

The ratio of the mean particle size of the fine particles to the mean particle size of the hollow resin particles (the mean particle size of the fine particles/the mean particle size of the hollow resin particles) is preferably (1) not higher than 1, (2) not higher than 0.1 or (3) not higher than 0.05 (where a greater number in the parentheses indicates a more preferable ratio) for sufficiently coating the hollow resin particles with the fine particles.

The amount of the fine particles in the fine-particle-coated hollow resin particles is not specifically restricted, and is preferably lower than 95 wt %. An amount of the fine particles not lower than 95 wt % can result in high amount of the fine-particle-coated hollow resin particles required to be added to a composition and lead to increased cost of the fine-particle-coated hollow resin particles. The upper limit of the amount of the fine particles is preferably (1) 90 wt %, (2) 85 wt % or (3) 80 wt % (where a greater number in the parentheses indicates a more preferable upper limit). The lower limit of the amount of the fine particles is preferably (1) 20 wt % or (2) 40 wt % (where a greater number in the parentheses indicates a more preferable lower limit).

The true specific gravity of the fine-particle-coated hollow resin particles is not specifically restricted and preferably ranges from 0.01 to 0.60 for attaining the effect of the present invention. The fine-particle-coated hollow resin particles having a true specific gravity lower than 0.01 can significantly change their true specific gravity with a change in heating time. On the other hand, the fine-particle-coated hollow resin particles having a true specific gravity higher than 0.6 have a poor effect of decreasing the specific gravity of the materials containing the particles. Thus, a high amount of such hollow resin particles is required to prepare a composition for lightweight articles, and such a high amount can impair the properties of the composition and resultant formed articles.

The upper limit of the true specific gravity of the fine-particle-coated hollow resin particles is preferably (1) 0.3 or (2) 0.2 (where a greater number in the parentheses indicates more preferable upper limit). On the other hand, the lower limit of the true specific gravity of the fine-particle-coated hollow resin particles is preferably (1) 0.05 or (2) 0.1 (where a greater number in the parentheses indicates a more preferable lower limit).

The fine-particle-coated hollow resin particles are prepared, for example, by thermally expanding fine-particle-coated heat-expandable microspheres. A preferable process for manufacturing the fine-particle-coated hollow resin particles includes a step of mixing heat-expandable microspheres and fine particles (mixing step) and a step of heating the mixture from the mixing step at a temperature higher than the softening temperature mentioned above to expand the heat-expandable microspheres and coat the outer surface of the resultant hollow resin particles with the fine particles (coating step).

Compositions and Formed Articles

The composition of the present invention contains a base component and at least one selected from the group consisting of the heat-expandable microspheres and the hollow resin particles mentioned above.

The base component is not specifically restricted, and includes, for example, rubbers, such as natural rubbers, butyl rubber, silicone rubber and ethylene-propylene-diene rubber (EPDM); thermosetting resins, such as unsaturated polyester resins, epoxy resins and phenolic resins; waxes, such as polyethylene waxes and paraffin waxes; thermoplastic resins, such as ethylene-vinyl acetate copolymer (EVA), ionomers, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon 6, nylon 66, etc.), polycarbonate, polyethylene terephthalate (PET), polybutylene terephthalate (PBT), polyacetal (POM) and polyphenylene sulfide (PPS); thermoplastic elastomers, such as olefin elastomers and styrene elastomers; bioplastics, such as polylactic acid (PLA), cellulose acetate, PBS, PHA and starch resins; sealing materials, such as silicones, modified silicones, polysulfides, modified polysulfides, urethanes, acrylates, polyisobutylenes and butyl rubbers; liquid ingredients including plastisols and emulsions of urethane polymers, ethylene-vinyl acetate copolymers, vinyl chloride polymers and acrylate polymers; inorganic materials, such as cement, mortar and cordierite; and organic fibers, such as cellulose fiber, kenaf, bran, aramid fiber, phenol fiber, polyester fiber, acrylic fiber, polyolefin fiber including polyethylene and polypropylene, polyvinyl alcohol fiber and rayon fiber. One of or a combination of at least two of those base components can be used.

The composition of the present invention is prepared by mixing the base component and at least one selected from the heat-expandable microspheres and hollow resin particles. The composition of the present invention can also be prepared by mixing another base component with the composition prepared by mixing the above-mentioned base component and at least one selected from the heat-expandable microspheres and hollow resin particles.

The composition of the present invention can contain other components which are optionally selected according to the intended application in addition to the at least one selected from the heat-expandable microspheres and hollow resin particles and the base component.

The amount of the at least one selected from the heat-expandable microspheres and hollow resin particles in the composition of the present invention is not specifically restricted and preferably ranges from 0.01 to 80 wt %. The amount of the at least one selected from the heat-expandable microspheres and hollow resin particles within the above range allows for making a composition which is lightweight and maintains the properties of the base component. The upper limit of the amount of the at least one selected from the heat-expandable microspheres and hollow resin particles is preferably (1) 70 wt %, (2) 60 wt %, (3) 50 wt %, (4) 25 wt % or (5) 10 wt % (where a greater number in the parentheses indicates a more preferable upper limit). On the other hand, the lower limit of the amount of the at least one selected from the heat-expandable microspheres and hollow resin particles is preferably (1) 0.03 wt %, (2) 0.05 wt %, (3) 0.1 wt %, (4) 0.3 wt % or (5) 0.5 wt % (where a greater number in the parentheses indicates a more preferable lower limit).

The procedure for preparing the composition of the present invention is not specifically restricted, and a known conventional procedure can be employed. The procedure includes, for example, uniform mixing with a machine, such as Homo-mixer, Static mixer, Henschel mixer, tumbler mixer, planetary mixer, kneader, roller kneader, mixing roller, mixer, single screw extruder, twin screw extruder or multi-screw extruder.

The composition of the present invention includes, for example, a rubber composition, molding composition, paint composition, cray composition, adhesive composition and powder composition.

The composition of the present invention is preferably in a liquid state (hereinafter also referred to as a liquid composition). The liquid composition includes, for example, a plastisol containing a plasticizer and vinyl chloride resin, acrylic resin, polyurethane resin, polyester resin, melamine resin, epoxy resin, ethylene-vinyl acetate copolymer (EVA) or rubbers such as natural rubber and styrene rubber; a resin emulsion containing a liquid dispersion medium; and a composition mixed with a liquid material such as latex. The liquid composition containing a plastisol, resin emulsion or latex often requires a long-time heating for processing, and the composition mentioned above enables production of lightweight formed articles with good expansion stability.

The plasticizer is not specifically restricted and includes phthalate plasticizers, such as dioctyl phthalate, diisobutyl phthalate and diisononyl phthalate; phosphate plasticizers, such as alkyl diphenyl phosphate; chlorinated aliphatic esters; chlorinated paraffins; low-molecular-weight epoxies; low-molecular-weight polyesters; adipate plasticizers, such as dioctyl adipate; and cyclohexane dicarboxylate plasticizers, such as diisononyl cyclohexane dicarboxylate.

The liquid dispersion medium is not specifically restricted and includes water, mineral spirits, methanol, ethyl acetate, toluene, methylethyl ketone, dimethylformamide and cyclohexanone.

The composition containing an aqueous resin emulsion can be processed into a sheet which is usable as wall paper. Such sheet can have a printing primer layer on its surface to facilitate printing and a protective layer can be placed on a printing ink layer to protect printing inks. Further, the sheet can be embossed to form a textured surface.

The composition can optionally contain some additives, such as fillers, pigments, high-boiling-point organic solvents and adhesives. The fillers include, such as, calcium carbonate, talc, titanium oxide, zinc oxide, clay, kaolin, silica and alumina. The pigments include, for example, carbon black and titanium oxide. The adhesives include, for example, a mixture of at least one selected from polyamines, polyamides and polyols and a prepolymer of a polyisocyanate having a terminal NCO group blocked with a proper blocking agent, such as oxime and lactam.

The amount of those additives is variable and selected according to the properties required of the composition.

The composition mentioned above is preferably a paint composition which is applicable as automotive paints, aircraft paints, train paints, paints for bodies of consumer electronics, external wall paints for buildings, paints for liner materials and paints for roofing materials. More preferable applications of the composition of the present invention include automotive undercoat materials, automotive body sealants and damping paints.

The composition of the present invention can be used as a master batch for resin and/or rubber molding if the composition contains the heat-expandable microspheres and the base component including a compound and/or thermoplastic resin having a melting point lower than the expansion-starting temperature of the heat-expandable microspheres (for example, waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET) and polybutylene terephthalate (PBT); ionomer resins, such as ethylene ionomers, urethane ionomers, styrene ionomers and fluorine ionomers; thermoplastic elastomers, such as olefin elastomers, styrene elastomers and polyester elastomers; and rubbers such as natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluorine rubber and ethylene-propylene-diene rubber (EPDM)). The master batch composition for the molding is preferably employed in injection molding, extrusion molding and press molding as an agent for introducing bubbles into molded products. Resins used for resin and/or rubber molding can be selected from the base components mentioned above without restriction, and include, for example, ethylene-vinyl acetate copolymer (EVA), polyethylene, modified polyethylene, polypropylene, modified polypropylene, modified polyolefin, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66, etc.), modified polyamide, polycarbonate, polyethylene terephthalate (PET), polybutylene terephthalate (PBT), polyacetal (POM), polyphenylene sulfide (PPS), polyphenylene ether (PPE), modified polyphenylene ether, ionomer resins, olefin elastomers, styrene elastomers, polyester elastomers, polylactic acid (PLA), cellulose acetate, PBS, PHA, starch resins, natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluorine rubber, ethylene-propylene-diene rubber (EPDM), and mixtures thereof. The composition can optionally contain reinforcement fibers, such as glass fiber, carbon fiber and natural fibers; inorganic powders, such as talc, titanium oxide, silica and inorganic pigments; organic powders, such as polymer particulates including acrylic particulates, styrene particulates, urethane particulates and silicone particulates, and organic pigments; flame retardants; and chemical blowing agents.

The formed article of the present invention is manufactured by forming or molding the composition mentioned above. The formed article of the present invention includes, for example, coatings and molded products.

The formed article of the present invention has a lightweight property, porosity, sound absorbency, thermal insulation, low thermal conductivity, permittivity-decreasing property, design potential, shock absorbing performance, strength, and chipping resistance, which have been efficiently improved. In addition, the formed product of the present invention is expected to maintain a stable shape against sink marks or distortion, minimize contraction and attain high dimensional stability. Further, the formed article of the present invention is lightweight and has good expansion stability with a minimum change in expansion ratio and specific gravity under long-time forming and varied heating times.

The composition and formed article of the present invention contain at least one selected from the heat-expandable microspheres and hollow resin particles manufactured by expanding the heat-expandable microspheres as mentioned above, and the composition and article have good expansion stability with a minimum change in expansion ratio and specific gravity with a change in heating time. The change in expansion ratio and specific gravity of the formed article is preferably lower than 10% and more preferably (1) lower than 8%, (2) lower than 5% or (3) lower than 3% (where a greater number in the parentheses indicates a more preferable change). The change is determined by the method described in the Examples below.

EXAMPLES

Examples of the heat-expandable microspheres of the present invention are specifically described below. However, the present invention is not restricted within the scope of those examples.

The properties and performances of the heat-expandable microspheres are determined or evaluated in the procedures described below. In the following description, heat-expandable microspheres are referred to as "microspheres" for the sake of brevity.

Mean Particle Size

A sample of microspheres was analyzed with a laser diffraction/scattering particle size distribution analyzer (Microtrac ASVR, manufactured by Nikkiso Co., Ltd.). The mean volume diameter $D_{50}$ in the analysis was defined as the mean particle size.

Expansion-Starting Temperature (Ts) and the Maximum Expansion Temperature (Tmax) of Microspheres The expansion-starting temperature and the maximum expansion temperature was determined with a DMA (DMA Q800, manufactured by TA Instruments). In an aluminum cup 4.8 mm deep and 6.0 mm in diameter, 0.5 mg of a sample of microspheres was placed, and the sample was covered with an aluminum lid (5.6 mm in diameter and 0.1 mm thick) to prepare a test sample. The test sample was set on the device and subjected to a pressure of 0.01 N with the compression unit of the device, and the height of the sample was measured. The sample was then heated by elevating the temperature at the rate of 10° C./min from 20 to 300° C., being subjected to the pressure of 0.01 N with the compression unit, and the change in the height of the sample was measured. The temperature at which the height started to increase was determined as the expansion-starting temperature $(T_s)$ of the microspheres, and the temperature at which the compression unit indicated the highest position was determined as the maximum expansion temperature $(T_{max})$ of the microspheres.

Maximum Expansion Ratio $(R_{max})$

The maximum expansion ratio of heat-expandable microspheres was calculated from the true specific gravity $(d_0)$ of heat-expandable microspheres before heating and the true specific gravity $(d_1)$ of (expanded) heat-expandable microspheres after heating.

The true specific gravity of heat-expandable microspheres was determined by the liquid substitution method (Archimedean method) with isopropyl alcohol in an atmosphere at 25° C. and 50% RH (relative humidity).

One gram of heat-expandable microspheres was heated in an oven at several temperature levels, which are within the range from their expansion-starting temperature $(T_s)$ to the temperature 100° C. higher than their maximum expansion temperature $(T_{max})$, respectively for 2 minutes at each temperature level. The lowest true specific gravity of the resultant expanded microspheres was considered to indicate the maximum expansion of the microspheres for determining their maximum expansion ratio. The maximum expansion ratio of heat-expandable microspheres $(R_{max})$ was calculated by the following formula.

$$R_{max} = d_0/d_1$$

Blowing-Agent Retainability

A TGA (TGA Q500, manufactured by TA Instruments) was employed for the testing. In a 500-µL ceramic pan which is 10.0 mm in diameter, 9.0 mm inner diameter and 8.0 mm deep, 0.5 mg of heat-expandable microspheres was placed and heated by elevating the temperature at the rate of 10° C./min from 25° C. to 50° C. Then the heat-expandable microspheres were continued to be heated at 50° C. for 30 min and the weight, Wo, of the heat-expandable microspheres after the heating was determined. After that, the heat-expandable microspheres were heated by elevating the temperature at the rate of 10° C./min from 50° C. to 350° C. The temperature at which the weight of the heat-expandable microspheres decreased by 0.5 wt % to the weight, Wo, was determined as the release-starting temperature, $T_R$ (° C.), of the blowing agent, and the lowest temperature in a temperature range in which the weight of the heat-expandable microspheres stopped decreasing as the release-ending temperature, $T_E$ (° C.).

Greater difference between $T_E$ and $T_R$, which was defined as ΔT, indicates better blowing-agent retainability of the heat-expandable microspheres.

Expansion Stability 1

A liquid composition was prepared by mixing 0.5 g of dry microspheres and 8.0 g of an aqueous emulsion of ethylene-vinyl acetate copolymer resin (the aqueous emulsion containing 55 wt % of ethylene-vinyl acetate copolymer resin composed of 30 wt % of ethylene and 70 wt % of vinyl acetate).

Then the liquid composition was applied on a sheet of plain paper with a coater and dried at room temperature to make a 100-µm thick EVA coating film containing unexpanded microspheres (hereinafter referred to as unexpanded EVA coating film) on the plain paper.

The unexpanded EVA coating film prepared as described above was heated at a predetermined temperature for 5 min and 10 min respectively to obtain expanded EVA coating films. The ratio of the thickness of the expanded EVA coating film to the thickness of the unexpanded EVA coating film was determined as the expansion ratio.

The predetermined temperature mentioned above was taken as the maximum expansion temperature $(T_{max})$ of the heat-expandable microspheres.

The change in expansion ratio (Ec) was calculated from the expansion ratio determined as described above by the following formula and the expansion stability was evaluated by the following criteria.

$$Ec = |1 - \{(\text{Expansion ratio of a coating film after 10-minute heating/Expansion ratio of a coating film after 5-minute heating})\} \times 100|(\%)$$

Ec is the absolute value and a smaller Ec indicates better expansion stability.

Heat-expandable microspheres resulting in Ec<5 were evaluated to have excellent expansion stability and were classified as A, heat-expandable microspheres resulting in 5≤Ec<10 were evaluated to have good expansion stability and were classified as B, and heat-expandable microspheres resulting in Ec≥10 were evaluated to have poor expansion stability and were classified as C.

Expansion Stability 2

A vinyl chloride compound was prepared by adding 2 parts of microspheres to a liquid Determination composed of 56 parts of vinyl chloride resin (ZEST-P-21), 92 parts of diisononyl phthalate and 52 parts of calcium carbonate, kneading the mixture and eliminating bubbles with an agitation defoamer.

The vinyl chloride compound prepared as described above was applied on a plate coated with cation electrodeposition (manufactured by Standard Test Piece Corp.) with a coater having 1.5-mm gap and heated at a predetermined temperature for 20 min and 60 min respectively to obtain vinyl chloride formed articles. The predetermined temperature was taken as the maximum expansion temperature ($T_{max}$) of the heat-expandable microspheres. The specific gravity of the resultant formed articles was determined with an electrical analytical balance AX 200 (manufactured by Shimadzu Corporation) in specific gravity determination mode for solids. The specific gravity of the formed article containing no microspheres was 1.3.

The change in specific gravity (Gc) was calculated from the specific gravity of the formed articles determined as described above by the following formula.

$Gc=1|-\{$(Specific gravity of a formed article obtained by 20-minute heating/Specific gravity of a formed article obtained by 60-minute heating)$\}\times 100|(\%)$ Gc is the absolute value and smaller Gc indicates better expansion stability.

Heat-expandable microspheres resulting in Gc<5 were evaluated to have excellent expansion stability and were classified as A, heat-expandable microspheres resulting in 5≤Gc<10 were evaluated to have good expansion stability and were classified as B, and heat-expandable microspheres resulting in Gc≥10 were evaluated to have poor expansion stability and were classified as C.

Example 1 (Table 1)

An aqueous dispersion medium was prepared by adding 115 g of sodium chloride, 65 g of colloidal silica containing 20 wt % of silica, 1 g of polyvinyl pyrolidone and 0.1 g of carboxymethylated polyethylene imine to 500 g of deionized water and adjusting the pH at 2.5 to 3.5.

An oily mixture was prepared by mixing 70 g of acrylonitrile, 90 g of methacrylonitrile, 40 g of methyl acrylate, 1 g of trimethylol propane trimethacrylate, 3 g of dilauroyl peroxide and 70 g of isobutane.

The aqueous dispersion medium and the oily mixture were mixed and agitated with a Homo-mixer (TK Homo-mixer, manufactured by Primix Corporation) at 10,000 rpm for 1 min and polymerized at 70° C. for 20 hours with agitation at 150 rpm under an initial reaction pressure of 0.5 MPa. The resultant polymerization product was filtered and dried to be prepared into heat-expandable microspheres 1 (microspheres 1). The resultant heat-expandable microspheres had a mean particle size of 31 μm, an expansion-starting temperature ($T_s$) of 81° C., a maximum expansion temperature ($T_{max}$) of 135° C., a maximum expansion ratio ($R_{max}$) of 334 times and a ΔT of 85° C. which indicates the blowing-agent retainability.

An EVA coating film and vinyl chloride compound were prepared by the methods mentioned above using the heat-expandable microspheres 1. The EVA coating film was heated at 135° C. for 5 minutes and for 10 minutes to be expanded and the vinyl chloride compound was heated at 135° C. for 20 minutes and for 30 minutes to be manufactured into a vinyl chloride formed product.

The expansion ratio of the EVA coating film after heating for 5 minutes was 11.74 times and the change in expansion ratio, Ec, of the EVA coating film after heating for 10 minutes was 1.3%. The specific gravity of the vinyl chloride formed article was 0.620 and the change in specific gravity, Gc, of the vinyl chloride formed article after heating for 60 minutes was 2.8%.

The resultant microspheres had good blowing-agent retainability, and the formed article manufactured from a composition containing the microspheres exhibited high expansion ratio, was lightweight and had good expansion stability.

Examples 2 to 15 and Comparative Examples 1 to 7

Heat-expandable microspheres (microspheres 2 to 22) were obtained in the same manner as in Example 1, except that the oily mixtures shown in Tables 1 to 3 were employed. The mean particle size, expansion-starting temperature, maximum expansion temperature, maximum expansion ratio, ΔT, Ec and Gc of the heat-expandable microspheres were evaluated. The results are shown in Tables 1 to 3.

TABLE 1

| | | | | | Examples | | | | | | |
|---|---|---|---|---|---|---|---|---|---|---|---|
| | | | | 1 | 2 | 3 | 4 | 5 | 6 | 7 | 8 |
| | | | | | | | Microspheres | | | | |
| | | | | Microspheres 1 | Microspheres 2 | Microspheres 3 | Microspheres 4 | Microspheres 5 | Microspheres 6 | Microspheres 7 | Microspheres 8 |
| Oily mixture (g) | Polymerizable component (g) | AN (A) | | 70 | 70 | 70 | 40 | 20 | 40 | 80 | 70 |
| | | MAN (B) | | 90 | 90 | 90 | 120 | 140 | 100 | 100 | 84 |
| | | Monomer (C) | MA | 40 | | | 40 | 40 | 60 | 20 | 30 |
| | | | EA | | | 40 | | | | | |
| | | | BA | | | | 40 | | | | |
| | | Monomer (D) | MMA | | | | | | | | 17 |
| | | | VAc | | | | | | | | |
| | | | MAA | | | | | | | | |
| | | Cross-linking agent | TMP | 1 | 1 | 0.5 | 0.7 | 1.2 | 0.8 | 0.6 | 0.7 |
| | Blowing agent (g) | Isobutane | | 70 | 70 | 70 | 70 | 70 | 70 | 58 | 70 |
| | | Isopentane | | | | | | | | 12 | |
| | | Isooctane | | | | | | | | | |
| Performance of | Mean particle size (μm) | | | 31 | 30 | 29 | 34 | 39 | 32 | 51 | 37 |
| | Expansion-starting tempreture [$T_S$] | | | 81 | 79 | 84 | 80 | 78 | 77 | 95 | 84 |

TABLE 1-continued

| | | | Examples | | | | | | | |
|---|---|---|---|---|---|---|---|---|---|---|
| | | | 1 | 2 | 3 | 4 | 5 | 6 | 7 | 8 |
| | | | Microspheres | | | | | | | |
| | | | Microspheres 1 | Microspheres 2 | Microspheres 3 | Microspheres 4 | Microspheres 5 | Microspheres 6 | Microspheres 7 | Microspheres 8 |
| heat-expandable microspheres | Maximum expansion tempreture [$T_{max}$] | | 135 | 134 | 135 | 131 | 116 | 121 | 154 | 141 |
| | Maximum expansion ratio [$R_{max}$] | | 334 | 353 | 189 | 328 | 93 | 360 | 241 | 260 |
| | Blowing-agent retainability ΔT | | 85 | 85 | 80 | 82 | 70 | 72 | 81 | 66 |
| | Expansion stability 1 | Expansion ratio 5 min | 11.74 | 12.05 | 8.21 | 11.03 | 5.44 | 12.17 | 9.24 | 9.73 |
| | | 10 min | 11.89 | 12.15 | 7.53 | 10.91 | 4.94 | 11.71 | 9.12 | 8.97 |
| | | Stability $E_c$ | 1.3 | 0.8 | 8.3 | 1.1 | 9.2 | 3.8 | 1.3 | 7.8 |
| | | Evaluation | A | A | B | A | B | A | A | B |
| | Expansion stability 2 | Specific gravity 20 min | 0.620 | 0.613 | 0.762 | 0.635 | 0.859 | 0.607 | 0.719 | 0.703 |
| | | 60 min | 0.638 | 0.631 | 0.818 | 0.655 | 0.940 | 0.638 | 0.742 | 0.766 |
| | | Stability $G_c$ | 2.8 | 2.9 | 6.8 | 3.1 | 8.6 | 4.8 | 3.1 | 8.2 |
| | | Evaluation | A | A | B | A | B | A | A | B |

TABLE 2

| | | | | Examples | | | | | | |
|---|---|---|---|---|---|---|---|---|---|---|
| | | | | 9 | 10 | 11 | 12 | 13 | 14 | 15 |
| | | | | Microspheres | | | | | | |
| | | | | Microspheres 9 | Microspheres 10 | Microspheres 11 | Microspheres 12 | Microspheres 13 | Microspheres 14 | Microspheres 15 |
| Oily mixture (g) | Polymerizable component (g) | AN (A) | | 51 | 77 | 40 | 30 | 60 | 70 | 98 |
| | | MAN (B) | | 71 | 78 | 60 | 68 | 83 | 90 | 99 |
| | | Monomer (C) | MA | 52 | 45 | 100 | 30 | 20 | 20 | |
| | | | EA | | | | | | 20 | |
| | | | BA | | | | | | | 3 |
| | | Monomer (D) | MMA | 27 | | | 45 | 23 | | |
| | | | VAc | | | | 14 | 14 | | |
| | | | MAA | | | | 14 | | | |
| | | Cross-linking agent | TMP | 0.7 | 1.1 | 1.2 | 0.9 | 0.8 | 1 | |
| | Blowing agent (g) | Isobutane | | 70 | 70 | 70 | 12 | 12 | 64 | 70 |
| | | Isopentane | | | | | 58 | 58 | | |
| | | Isooctane | | | | | | | 6 | |
| Performance of heat-expandable microspheres | Mean particle size (μm) | | | 28 | 42 | 37 | 18 | 25 | 32 | 86 |
| | Expansion-starting tempreture [$T_S$] | | | 86 | 78 | 81 | 118 | 123 | 95 | 90 |
| | Maximum expansion tempreture [$T_{max}$] | | | 136 | 120 | 115 | 160 | 168 | 153 | 142 |
| | Maximum expansion ratio [$R_{max}$] | | | 310 | 98 | 47 | 48 | 69 | 302 | 35 |
| | Blowing-agent retainability ΔT | | | 64 | 80 | 71 | 62 | 63 | 73 | 72 |
| | Expansion stability 1 | Expansion ratio | 5 min | 10.82 | 5.76 | 2.98 | 3.03 | 3.59 | 10.27 | 2.56 |
| | | | 10 min | 9.93 | 5.48 | 2.72 | 2.73 | 3.28 | 10.01 | 2.32 |
| | | Stability | $E_c$ | 8.2 | 4.8 | 8.6 | 9.8 | 8.7 | 2.5 | 9.3 |
| | | | Evaluation | B | A | B | B | B | A | B |
| | Expansion stability 2 | Specific gravity | 20 min | 0.651 | 0.837 | 0.948 | 0.932 | 0.898 | 0.702 | 0.991 |
| | | | 60 min | 0.712 | 0.892 | 1.044 | 1.032 | 0.992 | 0.748 | 1.074 |
| | | Stability | $G_c$ | 8.6 | 6.2 | 9.2 | 9.7 | 9.5 | 6.2 | 7.7 |
| | | | Evaluation | B | B | B | B | B | B | B |

TABLE 3

|  |  |  | Comparative examples | | | | | | |
|---|---|---|---|---|---|---|---|---|---|
|  |  |  | 1 | 2 | 3 | 4 | 5 | 6 | 7 |
|  |  |  | Heat-expandable microspheres | | | | | | |
|  |  |  | Micro-spheres 16 | Micro-spheres 17 | Micro-spheres 18 | Micro-spheres 19 | Micro-spheres 20 | Micro-spheres 21 | Micro-spheres 22 |
| Oily mixture (g) | Polymerizable component (g) | AN (A) | 90 | 104 | 130 |  | 140 | 70 | 4 |
|  |  | MAN (B) | 50 | 56 | 30 | 160 |  | 90 | 108 |
|  |  | Monomer (C) MA | 60 |  | 40 | 40 | 60 |  | 7 |
|  |  | EA |  | 40 |  |  |  |  |  |
|  |  | BA |  |  |  |  |  |  |  |
|  |  | Monomer (D) MMA |  |  |  |  |  | 20 |  |
|  |  | VAc |  |  |  |  |  |  |  |
|  |  | MAA |  |  |  |  |  | 20 | 81 |
|  |  | Cross-linking agent TMP | 1 | 1 | 1 | 0.8 | 1.1 | 1 | 0.9 |
| Blowing agent (g) | Isobutane | | 70 | 70 | 70 | 70 | 70 | 70 | 70 |
|  | Isopentane |  |  |  |  |  |  |  |  |
|  | Isooctane |  |  |  |  |  |  |  |  |
| Performance of heat-expandable microspheres | Mean particle size (μm) |  | 40 | 30 | 30 | 22 | 21 | 25 | 25 |
|  | Expansion-starting tempreture [$T_s$] |  | 84 | 85 | 93 | 95 | 86 | 132 | 160 |
|  | Maximum expansion tempreture [$T_{max}$] |  | 125 | 127 | 130 | 122 | 115 | 164 | 192 |
|  | Maximum expansion ratio [$R_{max}$] |  | 150 | 240 | 126 | 78 | 83 | 85 | 63 |
|  | Blowing-agent retainability ΔT |  | 52 | 56 | 51 | 36 | 37 | 45 | 35 |
|  | Expansion stability 1 | Expansion ratio 5 min | 7.25 | 9.21 | 6.89 | 4.26 | 4.37 | 4.42 | 3.62 |
|  |  | 10 min | 6.11 | 8.05 | 5.94 | 3.63 | 3.79 | 3.75 | 3.10 |
|  |  | Stability $E_c$ | 15.7 | 12.6 | 13.8 | 14.9 | 13.3 | 15.2 | 14.4 |
|  |  | Evaluation | C | C | C | C | C | C | C |
|  | Expansion stability 2 | Specific gravity 20 min | 0.786 | 0.724 | 0.825 | 0.856 | 0.872 | 0.842 | 0.921 |
|  |  | 60 min | 0.917 | 0.807 | 0.947 | 0.990 | 0.998 | 0.981 | 1.061 |
|  |  | Stability $G_c$ | 14.3 | 10.3 | 12.9 | 13.5 | 12.6 | 14.2 | 13.2 |
|  |  | Evaluation | C | C | C | C | C | C | C |

The monomers and compounds in Tables 1 to 3 are represented by the following abbreviations.
AN: acrylonitrile
MAN: methacrylonitrile
MA: methyl acrylate
EA: ethyl acrylate
BA: n-butyl acrylate
MMA: methyl methacrylate
VAc: vinyl acetate
MAA: methacrylic acid
TMP: trimethylol propane trimethacrylate
Isobutane: 2-methyl propane
Isopentane: 2-methyl butane
Isooctane: 2,2,4-trimethyl pentane The heat-expandable microspheres of Examples 1 to 15 have good blowing-agent retainability as indicated by the high ΔT which is at least 60° C. The good blowing-agent retainability of the heat-expandable microspheres results in minimum change, which is less than 10%, in expansion ratio and specific gravity of a composition containing the microspheres and a base component under varied heating times when the composition is heated to be processed into a lightweight formed article, and thus enables the production of a formed article of high expansion stability.

On the other hand, the heat-expandable microspheres of Comparative Examples 1 to 7 have poor blowing-agent retainability, and their expansion ratio and specific gravity significantly change with a change in heating time leading to poor expansion stability of the resultant article.

INDUSTRIAL APPLICABILITY

The heat-expandable microspheres of the present invention are usable as a lightweight filler for putties, paints, inks, sealants, mortar, paper clays and porcelains and can be blended with a base component to be processed by injection molding, extrusion molding or press molding and manufactured into molded articles having good properties of sound insulation, thermal insulation, heat shielding and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. Heat-expandable microspheres comprising a thermoplastic resin shell and a thermally-vaporizable blowing agent encapsulated therein;
   wherein the expansion-starting temperature ranges from 50 to 125° C.,
   the thermoplastic resin is a polymer of a polymerizable component containing acrylonitrile (A), methacrylonitrile (B) and acrylate ester (C); and
   the thermoplastic resin satisfies the following conditions 1 and 2:
   Condition 1: The amounts of the acrylonitrile (A) and the methacrylonitrile (B) in the polymerizable component satisfy formula (I) shown below:

$$\text{Amount of the acrylonitrile } (A) < \text{amount of the methacrylonitrile } (B) \quad \text{Formula (I)}$$

Condition 2: The total amount of the acrylonitrile (A), the methacrylonitrile (B) and the acrylate ester (C) in the polymerizable component ranges from 75 to 100 wt %.

2. The heat-expandable microspheres as claimed in claim 1, wherein the amount of the acrylonitrile (A) ranges from 1 to 49 wt %, the amount of the methacrylonitrile (B) ranges from 5 to 80 wt % and the amount of the acrylate ester (C) ranges from 1 to 50 wt % of the polymerizable component.

3. The heat-expandable microspheres as claimed in claim 1, wherein the acrylate ester (C) is at least one selected from the group consisting of methyl acrylate, ethyl acrylate and n-butyl acrylate.

4. Hollow resin particles manufactured by expanding the heat-expandable microspheres as claimed in claim 1.

5. A composition comprising a base component and the heat-expandable microspheres as claimed in claim 1.

6. The composition as claimed in claim 5, wherein the composition is a liquid.

7. The composition as claimed in claim 5, wherein the composition is a paint composition.

8. A formed article manufactured by forming or molding the composition as claimed in claim 5.

9. A composition comprising a base component and the hollow resin particles as claimed in claim 4.

10. The composition as claimed in claim 9, wherein the composition is a liquid.

11. The composition as claimed in claim 9, wherein the composition is a paint composition.

12. A formed article manufactured by forming or molding the composition as claimed in claim 9.

13. The heat-expandable microspheres as claimed in claim 1, wherein the amount of the acrylonitrile (A) ranges from 1 to 49 wt %, the amount of the methacrylonitrile (B) ranges from 5 to 80 wt % and the amount of the acrylate ester (C) ranges from 10 to 50 wt % of the polymerizable component.

14. The heat-expandable microspheres as claimed in claim 1, wherein a maximum expansion temperature of the heat-expandable microspheres ranges from 95 to 190° C.

* * * * *